(12) United States Patent
Lisby et al.

(10) Patent No.: US 11,940,094 B2
(45) Date of Patent: Mar. 26, 2024

(54) CENTRAL LUBRICATING STATION

(71) Applicant: Hove A/S, Glostrup (DK)

(72) Inventors: Thomas Lisby, Svendborg (DK); William Lisby, Svendborg (DK); Ivan Madsen, Odense Sv (DK)

(73) Assignee: Hove A/S, Glostrup (DK)

(*) Notice: Subject to any disclaimer, the term of this patent is extended or adjusted under 35 U.S.C. 154(b) by 427 days.

(21) Appl. No.: 16/606,978

(22) PCT Filed: Apr. 25, 2018

(86) PCT No.: PCT/EP2018/060586
§ 371 (c)(1),
(2) Date: Oct. 21, 2019

(87) PCT Pub. No.: WO2018/197557
PCT Pub. Date: Nov. 1, 2018

(65) Prior Publication Data
US 2020/0049310 A1  Feb. 13, 2020

(30) Foreign Application Priority Data

Apr. 27, 2017 (EP) .................................... 17168456

(51) Int. Cl.
F16H 57/04 (2010.01)
F01M 1/02 (2006.01)
(Continued)

(52) U.S. Cl.
CPC ............... *F16N 7/385* (2013.01); *F01M 1/02* (2013.01); *F01M 11/04* (2013.01); *F03D 80/70* (2016.05);
(Continued)

(58) Field of Classification Search
CPC .......... F16N 7/385; F16N 19/00; F16N 29/00; F16N 29/02; F16N 37/00;
(Continued)

(56) References Cited

U.S. PATENT DOCUMENTS 2,790,508 A * 4/1957 Allander et al. ....... B01D 45/14
55/394
3,987,869 A * 10/1976 Bowers .................. F16N 13/10
224/628
(Continued)

FOREIGN PATENT DOCUMENTS

CN 102084128 A 6/2011
CN 102588723 A 7/2012
(Continued)

OTHER PUBLICATIONS

Hove: "Hove Easy Grease : Hove A/S" Retrieved from the Internet: URL: https://web.archive.org/web/20170226152036/http://hove-as.dk/en/products/dosing-units/hove-easy-grease; retrieved on Oct. 10, 2017, pp. 1-2.
(Continued)

*Primary Examiner* — Michael R Mansen
*Assistant Examiner* — Mark K Buse
(74) *Attorney, Agent, or Firm* — DINSMORE & SHOHL LLP

(57) ABSTRACT

A central lubricating station for lubricating one or more machine part(s), having a container base adapted for holding at least two replaceable containers. Each replaceable container holds at least one type of lubricant; and one or more pump(s) is configured for pumping at least one type of lubricant interchangeably from the at least two replaceable containers to the one or more machine part(s); and a motor is configured for driving the one or more pumps.

11 Claims, 1 Drawing Sheet

(51) Int. Cl.

| | |
|---|---|
| *F01M 11/04* | (2006.01) |
| *F03D 80/70* | (2016.01) |
| *F16N 7/38* | (2006.01) |
| *F16N 19/00* | (2006.01) |
| *F16N 29/00* | (2006.01) |
| *F16N 29/02* | (2006.01) |
| *F16N 37/00* | (2006.01) |

(52) U.S. Cl.
CPC ......... *F16H 57/0434* (2013.01); *F16N 19/00* (2013.01); *F16N 29/00* (2013.01); *F16N 29/02* (2013.01); *F16N 37/00* (2013.01); *F01M 2011/0483* (2013.01); *F05B 2240/50* (2013.01); *F16N 2210/025* (2013.01); *F16N 2210/12* (2013.01); *F16N 2210/14* (2013.01); *F16N 2270/60* (2013.01); *F16N 2270/70* (2013.01)

(58) Field of Classification Search
CPC ........... F16N 2210/025; F16N 2210/12; F16N 2210/14; F16N 2270/60; F16N 2270/70; F16N 39/00; F16N 7/38; F01M 1/02; F01M 11/04; F01M 2011/0483; F03D 80/70; F16H 57/0434; F16H 57/04; F05B 2240/50; F05B 2260/98; Y02E 10/72
See application file for complete search history.

(56) References Cited

U.S. PATENT DOCUMENTS

| | | | | |
|---|---|---|---|---|
| 5,259,481 | A * | 11/1993 | Meuer | B60R 17/00 184/45.1 |
| 6,098,752 | A * | 8/2000 | McCaleb | F01M 11/045 184/26 |
| 6,125,969 | A * | 10/2000 | Graf | F16N 11/08 184/26 |
| 11,255,233 | B2 * | 2/2022 | Sloan | F04B 49/20 |
| 2003/0048963 | A1 | 3/2003 | Jacquemont et al. | |
| 2004/0003969 | A1 * | 1/2004 | O'Toole | F16N 19/00 184/26 |
| 2011/0150655 | A1 * | 6/2011 | Tietze | F16H 57/0447 74/467 |
| 2019/0001954 | A1 * | 1/2019 | Ali | F28D 20/02 |
| 2019/0136727 | A1 * | 5/2019 | Lamb | F16H 57/045 |
| 2020/0049310 | A1 * | 2/2020 | Lisby | F16N 29/02 |

FOREIGN PATENT DOCUMENTS

| | | |
|---|---|---|
| CN | 203231065 U | 10/2013 |
| CN | 204283754 U | 4/2015 |
| CN | 105765289 A | 7/2016 |
| DE | 102009018969 A1 | 10/2010 |
| JP | 2008303928 A | 12/2008 |
| JP | 5114100 B2 | 1/2013 |
| WO | 2015082257 A1 | 6/2015 |

OTHER PUBLICATIONS

Chinese Search Report dated Jul. 16, 2020; International Chinese Application No. 2018800280776.

* cited by examiner

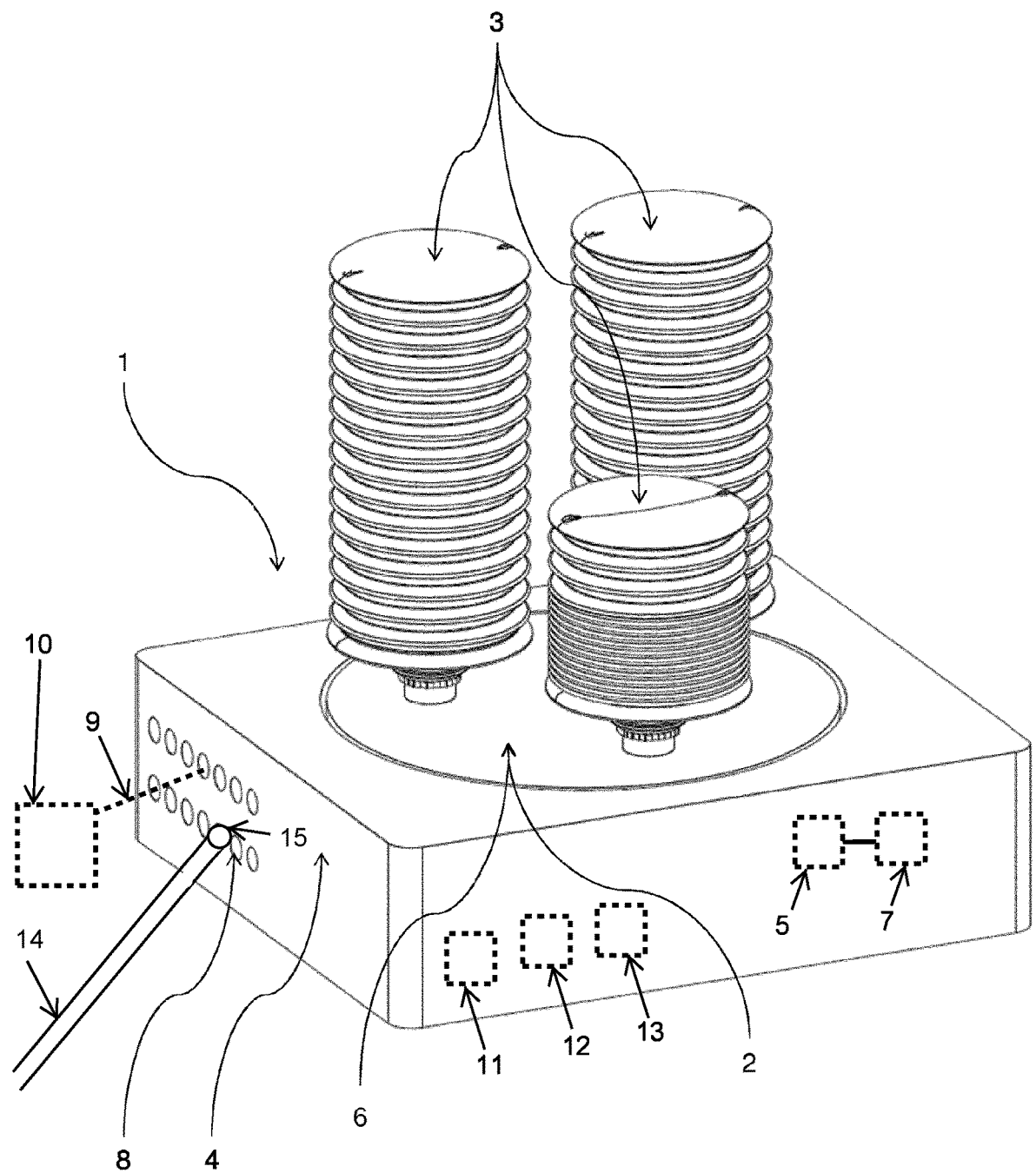

CENTRAL LUBRICATING STATION

REFERENCE TO RELATED APPLICATIONS

This application is a U.S. national stage application of PCT/EP2018/060586, filed Apr. 25, 2018, which claims priority to European Patent Application No. EP17168456.6, filed Apr. 27, 2017, the entire content of both applications being incorporated herein by reference.

FIELD OF THE INVENTION

The present disclosure relates to a lubrication station, more specifically a lubrication station that is central for lubricating machine parts, for example in a wind turbine.

BACKGROUND OF THE INVENTION

Lubrication of machine parts typically involves pumping lubricant from a pumping device to the machine parts. The pumping device may either be transportable or stationary. When using a transportable lubrication station, both the pumping device and the lubricant are transported to the lubrication location. Such transportation may be time demanding and heavy. In some situations, it may even be difficult to approach the machine parts, for example if the machine parts are inside limited space. To avoid transportation of the pumping device and the lubricant, a stationary lubrication station may be a good solution. A stationary lubrication station may for example be installed in a facility having various machine parts, such that the machine parts can be lubricated on demand. A wind turbine is an example of such a facility. Lubrication optimized the performance of the wind turbine and prevents it from being out of operation. If prevented from producing energy, the time out of operation is a huge waste of wind energy production and consequently a loss of money. The operators of wind turbines are therefore carefully monitoring the operation and output from individual wind turbines. If a lack of lubricant is observed, lubricant may either be pumped from a stationary lubrication station or a transportable lubrication station as previously described. Lubricant may depending on the machine part and their operation be supplied to the machine parts in small amounts within a small time interval or a greater amount within a greater time interval. In case of a stationary lubrication station, it is of uttermost importance that lubricant is always present in the lubrication station, such that the machine parts do not dry out. It is therefore important that careful control of the amount of lubricant is carried out on a regular basis.

If a stationary lubrication station is emptied from lubricant, it may be required that the machine parts are lubricated using the transportable lubrication station, in other words, as a maintenance service. Alternatively and/or additionally, the stationary lubrication station may be re-filled with lubricant using the transportable lubrication station, for example also as a maintenance service. Such solutions take time, and maintenance time is valuable time in which the wind turbine is prevented from producing energy.

To avoid so-called down-time of wind turbines, the stationary lubrication stations may be re-filled with lubricant before the lubricant is used. Alternatively, the stationary lubrication station may be replaced with another lubrication station or with another container with lubricant before lubricant is emptied from the lubrication station or the container.

In case of re-filling lubricant, lubricant may be re-filled such that only the re-filled lubricant is used, and the remaining lubricant is never used, thus wasted. In case of replacing the old lubricant with new lubricant, the old lubricant may for example be disposed as waste, hence never used. Wasting lubricant is problematic for the environment and a waste of money.

There is therefore a need of a cost efficient stationary lubrication system that is first of all able to use all the lubrication in the lubrication system without being wasted.

SUMMARY OF THE INVENTION

It is an objective of the present disclosure to provide a stationary lubrication system that first of all saves lubricant from being wasted.

The present disclosure solves this problem by providing a central lubrication station according to a first aspect of the disclosure. The first aspect of the disclosure relates to a central lubricating station for lubricating one or more machine part(s), comprising: a container base adapted for holding at least two replaceable containers, each re-placeable container holding at least one type of lubricant; and one or more pump(s) configured for pumping at least one type of lubricant interchangeably from the at least two replaceable containers to the one or more machine part(s); and a motor configured for driving the one or more pumps. Preferably the container base is configured for transferring lubricant from one replaceable container to another replaceable container, such that lubricant in any of the containers is prevented from sedimenting.

Several advantages are provided by having at least two replaceable containers in the container base. A first advantage is that one of the containers can be completely emptied such that lubricant can be supplied to the machine parts from one of the other containers. Thereby is provided a system, where a container can be completely emptied without the need for maintenance service or an immediate replacement of a container. Another advantage is that all of the lubricant in a container is used and nothing is wasted. Thereby is provided a system, which is more environmentally friendly and cost effective. Further, because the containers are replaceable, there is no need for re-filling, which takes long time. Thereby is provided a system which allows for quick replacement of containers and lubricant.

The central lubrication station as herein referred to is central in the sense that it may be used in a single wind turbine, and configured for supplying various machine parts from within the wind turbine. In other words, the central lubrication station may be central for all vital parts, such as machine parts, of the wind turbine.

In a second aspect of the disclosure, there is provided a lubrication system for lubricating one or more machine parts, comprising the central lubrication station according the first aspect and at least two replaceable containers re-placeably attached to the container base of the central lubrication station, and a connection between the lubrication station and the one or more machine parts.

The at least two replaceable containers can be replaced at any time, but optimally one container is replaced at a time, when it is about to be empty or has been emptied. One container may hold one type of lubricant. Another container may hold that same type of lubricant or another. If both at least two containers hold the same type of lubricant, the same type of lubricant is able to be supplied to one machine part, for example requiring one type of lubricant. However, by having another type of lubricant in another container, two different machine parts may be supplied with two different types of lubricant from two different containers. In some embodiments, one container may hold more than one type of lubricant, for example in separate spaces within the container. The one container may then be used for supplying various machine parts requiring different types of lubricant. As here illustrated, the present disclosure provides a system with many combinations of containers and types of lubricants, thereby a system which is adaptable to specific lubrication tasks and specific machine parts.

In a third aspect of the disclosure, there is provided a method for operating a central lubricating station, comprising the steps of: providing a central lubrication station comprising at least two replaceable containers, each container holding at least one type of lubricant, and one or more pump(s); and pumping one type of lubricant to one machine part from one of the at least two containers, such that when the one of the at least two replaceable containers is empty or near empty, pumping is continued from another of the at least two replaceable containers, and such that when the another of the at least two replaceable containers is empty or near empty, pumping is continued from an additional replaceable container.

As can be understood from the above described method, emptying one of the at least two containers, does not affect the continuous lubrication of the machine parts, and therefore, the present invention provides a method that allows for continuous lubrication of machine part while not preventing machine parts from being in operation.

BRIEF DESCRIPTION OF THE DRAWINGS

In the following, the disclosure is described in more detail with reference to the following drawing, in which:

FIG. 1 is a schematic of one embodiment of the central lubrication station according to the present disclosure.

DETAILED DESCRIPTION OF THE INVENTION

According to the first aspect of the invention, the pump(s) of the central lubrication station is driven by a motor. Accordingly, the motor may drive all of the pumps so there is only need for one motor. Such a configuration saves space and cost while also provides for easy maintenance, in particular because only a single motor may need to be working and repaired if broken. On the other hand, if a plurality of motors drives the pumps, it is possible that all of the pumps can be driven by just one of the plurality of motors. Thus, if one motor breaks down, there may not be a need for an immediate motor replacement or repair.

In one embodiment of the first aspect of the present disclosure, the central lubrication station is configured for selectively pumping the at least one type of lubricant from any of the at least two replaceable containers to one machine part. In this embodiment, one type of lubricant may first be supplied from one container, and then from another container. It is most likely that lubricant is pumped from one container and the container is emptied before lubricant is pumped from another container. However, there may be some scenarios in which this is not the case. For example, it may happen that lubricant is blocked inside the container, such as happens when the lubricant sediments. In such a case, the central lubrication is able to select the other container and pump lubricant from that one instead of the container that is blocked. If one container is emptied, the central lubrication station may automatically select to pump the at least one type of lubricant from a non-empty container. When an empty and a non-empty container are present, the empty container may be replaced with a full container, from which pumping can then be continued. The process may then repeat itself, so all containers may be replaced and all of the lubricant may be used.

In another embodiment of the first aspect of the present disclosure, the central lubrication station is configured for selectively pumping the at least one type of lubricant from the at least two replaceable containers to at least two machine parts. In this embodiment, one type of lubricant may first be supplied from one container to a first machine part, and another type of lubricant may be supplied from the other container to a second machine part. Accordingly, two different types of lubricant in the lubrication station may be supplied to two different machine parts, for example requiring two different lubrication types. Alternatively and/or additionally, one type of lubricant from one part of the container may be supplied to the first machine part, and another type of lubricant from another part of the container may be supplied to the first machine part or the second machine part. The central lubrication station may in other words be configured for selectively pumping at least two types of lubricant from different parts of one of the replaceable containers to the one or more machine parts. The different embodiments as here described may depend on factors such as how much space the lubrication station is able to take up, how much lubricant is needed to be supplied to the various machine parts and under which conditions the lubricant is supplied to the machine parts.

Container Base

The container base according to the disclosure may comprise a rail adapted for holding the at least two containers.

The container base may alternatively comprise a disc adapted for holding the at least two containers. The disc may be configured for holding the at least two containers such that the containers can change positions when the disc is rotated. The one or more pump(s) is configured for pumping at least one type of lubricant interchangeably from the at least two replaceable containers to the one or more machine part(s), for example, when the containers are rotated from one to another position. By having two types of lubricants, for example in two or three containers, a change of lubricant types may be provided by rotating the disc from one position to another. The container base may comprise a single outlet for all the containers.

The container base may be configured for only letting lubricant out of one of the containers when the one container is placed in fluid communication with the single outlet. The placement of the container may be enabled by rotation of the disc.

The container base may comprise a channeling system configured such that the lubricant of the containers is able to be transferred from the container to the machine part, and/or from one and another of the containers. In some embodiments, the container base may be configured such that fluid communication is enabled between the containers and to the machine parts, for example via tubes, hoses and/or channels within the container base.

In one embodiment, the container base comprises a physical base connector for each of the at least two containers having a corresponding physical container connector, such that the container can only be pumped from via the central lubrication station when the physical container connector matches the physical base connector. For example, one container holding one type of lubricant may have one type of physical container connector, such as a geometrically shaped container, which only fits into the physical container base where a corresponding holder is shaped as the container. The physical container connector may in some embodiments be connected to a hose which is able to be connected to the container only if the container has a corresponding container connector. In this way, there is provided a solution for connecting the right type of lubricant to the intended place on the base connector so the right type of lubricant is pumped to the right type of machine part.

In another embodiment, the container base comprises an electrical base connector code for each of the at least two containers having a corresponding electrical container code, such that the container can only be pumped from via the central lubrication station when the electrical container code matches the electrical base connector code. For example, the container may be equipped with an RFID code that is read by the container base and configured such that the container is only opened or allowed to be pumped from if the RFID code matches a code on the container base.

In a preferred embodiment of the first aspect of the disclosure, the container base is configured to allow any of the replaceable containers to be replaced by additional replaceable containers without letting air into the central lubrication station. Air is typically let into a lubricant container during re-fill, and this can have a severe effect on both the lubrication system and the machine parts. Air should therefore at the best be avoided from entering a lubrication system. By replacing a container rather than re-filling lubricant to a container, there is provided a simple and efficient solution to avoid getting air bubbles in the system.

In some embodiments of the first aspect of the disclosure, the container base is configured for releasing a pressure between the central lubricating station and the machine part(s). The pressure may be released via a coupling either connected or mounted to the container base.

As previously described, the container base may be configured for transferring lubricant from one replaceable container to another replaceable container. One advantage of this may be that if a container is close to being empty, the remaining lubricant may be transferred to another of the containers. For example, there may intentionally be left some space in a container when it is connected to the container base, so that there is space available for exactly this kind of lubricant. In this manner, lubricant is simply transferred to a container that may already be placed in the container base, and one of the containers can be completely emptied so no lubricant is wasted.

When experimenting with this setup, the inventors found that by enabling transfer of lubricant from one and another container, lubricant was forced to move, and therefore prevented from sedimenting. The embodiment related to transfer of lubricant therefore not only relates to emptying a container, but also provides a solution for preventing that lubricant is blocked. A transfer of lubricant between containers from time to time is thus an efficient way of moving the lubricant without moving parts inside the container, such as a stirrer, or without using rotation or translation of the container itself. Accordingly, the inventors have found that the lubrication station can be configured such that lubricant in any of the containers is prevented from sedimenting.

Other than using transfer of lubricant from one container to another, the inventors also found that lubricant sedimenting on the bottom can be avoided by having a stirrer inside the container.

In other embodiments, the container base is configured to individually move any of the at least two replaceable containers, such that lubricant in each of the containers is prevented from sedimenting. The container may for example be rotated or swirled, or as previously described, translated. A combination of movements may also prevent the lubricant from sedimenting.

Pump(s) and Additional Units

In most embodiments, the pump(s) is/are configured for operating at a high pressure of more than 100 bars, such as more than 150 bars or such as more than 200 bars. In most preferred embodiments, the pump(s) is/are gear pumps. Such pumps are reliable when being operated with lubricant and harsh environment and can be configured for operating at the desired high pressures.

In one embodiment of the first aspect of the invention, the central lubrication station further comprises a flow meter 11 such that the central lubrication station is able to be flow controlled.

In another embodiment, the central lubrication station further comprises a pressure measure such that the central lubrication station is able to be pressure controlled.

In yet another embodiment, the central lubrication station further comprises a first diagnostic unit 12 configured for sensing that any of the two replaceable containers is out of operation. If out of operation, the central lubrication may be configured for selecting another container and then find out if this is out of operation.

In a preferred embodiment, the central lubrication station further comprises a second diagnostic unit 13 configured for sensing an insufficient amount of lubricant in any of the one or more machine part(s). The diagnostic unit may be a sensor, such as optical or electronic sensors, such as a camera or a thermometer. Units such as these may for example monitor the operation of a wind turbine and sense whether or not a wind turbine rotates properly and/or produces too much of heat.

In a most preferred embodiment, the central lubrication station further comprises an automatic responder unit configured for responding to the insufficient amount of lubricant by commanding the one or more pumps to pump the insufficient amount of lubricant to the one or more machine part(s). The automatic responder unit may be computer and/or a controller coupled to the pumps.

Lubrication System

According to the second aspect of the disclosure, the central lubrication station is connected to machine parts via a connection. The connection may be a hose.

In preferred embodiments, the connection comprises a lubrication nipple. The lubrication nipple may be in fluid contact with the machine parts.

The machine parts may be bearings, such as a crank shaft bearing and a pivot bearing and/or gears, for example connected to shafts.

In a most preferred embodiment, the lubrication system is mounted in a nacelle of a wind turbine.

Method

In one embodiment of the method, the method further comprises the step of when the one or the other of the at least two replaceable containers is empty or near empty, one of the at least two replaceable containers is replaced by the additional replaceable container. Thereby is provided a method that provides for a cost efficient use of containers without wasting lubricant.

In a second embodiment of the method, the central lubrication station comprises at least three replaceable containers, such that the additional replaceable container is one of the at least three replaceable containers. In this embodiment, a selection of three containers is enabled which allow for a more flexible method for pumping various types of lubricant to different machine parts.

In a preferred embodiment, the central lubrication station further comprises the step of pumping one or another type of lubricant to another machine part from the at least two replaceable containers. In this embodiment, selection of types of lubricant to different machine parts is enabled. This may be of importance if different machine parts require different types of lubricant.

As previously described, the method may in some embodiments further comprise the step of when the one or the other of the at least two replaceable containers is near empty, remaining lubricant is transferred to another of the at least two replaceable containers. This may ensure that all lubricant is used from one container and not wasted.

In various embodiments, the central lubrication station is the central lubrication station according to the first aspect.

Example 1—A Central Lubrication Station

FIG. 1 shows one embodiment of the central lubrication station 1 according to the present invention. The central lubrication station 1 comprises a container base 2 adapted for holding at least two replaceable containers 3, in this case, three replaceable containers 3. Each replaceable container holds one type of lubricant. The container base is placed in a housing 4. In other words, the central lubrication station comprises a housing 4. The central lubrication station 1 comprises one or more pump(s) 5 placed inside the housing 4 (thus not to be seen on this drawing). The pump(s) is/are configured for pumping at least one type of lubricant interchangeably from the at least two replaceable containers 3 to the one or more machine part(s) 10. The pumping is pumped interchangeably from any of the three containers by rotating the container base 2 station. More specifically, the central lubrication station comprises a disc 6. The disc 6 is the container base. When the disc 6 is rotated to a specific position, for example as shown, the one or more pumps 5 is able to pump lubricant from one of the containers 3. The disc 6 is placed in or on the central lubrication station 1, in this example in the housing 4. Further, a motor 7 is placed inside the housing (thus not to be seen in this drawing). The motor 7 is configured for driving the one or more pumps 5. As can be seen from FIG. 1, one of the containers is smaller than the two others since lubricant has been pumped from that container. Lubricant is able to be pumped from the container to one of the outlets 8 on the central lubrication station 1. From the outlets 8, one or more connections 9, such as hoses 14 and nipples 15, may be connected to machine part(s) 10. Further, lubricant is able to be pumped from one of the containers 3 and to any of the others. As can be seen, there may be some space left in the two large containers 3, since the containers are foldable and not extended to their maximum. Accordingly, lubricant may be transferred from the near empty container 3 (the one in the front) to any of the non-empty containers (the two in the back). Lubricant can thereby be emptied from the near-empty container 3, whereafter that container 3 can be re-placed by another container, such as a new container. Lubricant can thereby also be moved and thus be prevented from sedimenting. The present example shows how lubricant is not wasted. Further, the present example shows how lubricant is prevented from sedimenting.

It will be apparent to those skilled in the art that various modifications and variations can be made in the present disclosure without departing from the scope of this disclosure. It is to be understood that the detailed description of the present disclosure are exemplary and explanatory and are intended to provide further explanation of the disclosure. It is not intended to be exhaustive or to limit embodiments to the precise form disclosed.

Further details of the present disclosure are described by the following items.

Items

1. A central lubricating station for lubricating one or more machine part(s), comprising:
   a container base adapted for holding at least two replaceable containers, each replaceable container holding at least one type of lubricant; and
   one or more pump(s) configured for pumping at least one type of lubricant interchangeably from the at least two replaceable containers to the one or more machine part(s); and
   a motor configured for driving the one or more pumps.
2. The central lubrication station according to item 1, wherein the central lubrication station is configured for selectively pumping the at least one type of lubricant from any of the at least two replaceable containers to one machine part.
3. The central lubrication station according to any of the preceding items, wherein the central lubrication station is configured for selectively pumping the at least one type of lubricant from the at least two replaceable containers to at least two machine parts.
4. The central lubrication station according to any of the preceding items, wherein the container base comprises a physical base connector for each of the at least two containers having a corresponding physical container connector, such that the container can only be pumped from via the central lubrication station when the physical container connector matches the physical base connector.
5. The central lubrication station according to any of the preceding items, wherein the container base comprises an electrical base connector code for each of the at least two containers having a corresponding electrical container code, such that the container can only be pumped from via the central lubrication station when the electrical container code matches the electrical base connector code.
6. The central lubrication station according to any of the preceding items, wherein the container base is configured to allow any of the replaceable containers to be replaced by additional replaceable containers without letting air into the central lubrication station.
7. The central lubrication station according to any of the preceding items, wherein the container base is configured for releasing a pressure between the central lubricating station and the machine part(s).
8. The central lubrication station according to any of the preceding items, wherein the container base is configured for transferring lubricant from one replaceable container to another replaceable container.
9. The central lubrication station according to item 8, such that lubricant in any of the containers is prevented from sedimenting and/or such that any of the containers is able to be emptied without loss of lubricant.
10. The central lubrication station according to any of the preceding items, wherein the container base is configured to individually move any of the at least two replaceable containers, such that lubricant in each of the containers is prevented from sedimenting.
11. The central lubrication station according to any of the preceding items, wherein the pump is configured for operating at a high pressure of more than 100 bars, such as more than 150 bars or such as more than 200 bars, such as more than 300 bars or such as more than 400 bars.

12. The central lubrication station according to any of the preceding items, wherein the central lubrication station further comprises a flow meter such that the central lubrication station is able to be flow controlled.

13. The central lubrication station according to any of the preceding items, wherein the central lubrication station further comprises a pressure measure such that the central lubrication station is able to be pressure controlled.

14. The central lubrication station according to any of the preceding items, wherein the central lubrication station further comprises a first diagnostic unit configured for sensing that any of the two replaceable containers is out of operation.

15. The central lubrication station according to any of the preceding items, wherein the central lubrication station further comprises a second diagnostic unit configured for sensing an insufficient amount of lubricant in any of the one or more machine part(s).

16. The central lubrication station according to item 15, wherein the central lubrication station further comprises an automatic responder unit configured for responding to the insufficient amount of lubricant by commanding the one or more pumps to pump the insufficient amount of lubricant to the one or more machine part(s).

17. A lubrication system for lubricating one or more machine parts, comprising the central lubrication station according to any of the preceding items 1-16 and at least two replaceable containers re-placeably attached to the container base of the central lubrication station, and a connection between the lubrication station and the one or more machine parts.

18. The lubrication system according to item 17, wherein the connection is a hose.

19. The lubrication system according to any of the preceding items 17-18, wherein the connection comprises a lubrication nipple.

20. The lubrication system according to any of the preceding items 17-19, wherein the machine parts are bearings, such as a crank shaft bearing and a pivot bearing and/or gears, for example connected to shafts.

21. The lubrication system according to any of the preceding items 17-20, wherein the lubrication system is mounted in a nacelle of a wind turbine.

22. A method for operating a central lubricating station, comprising the steps of:
    providing a central lubrication station comprising at least two replaceable containers, each container holding at least one type of lubricant, and one or more pump(s); and
    pumping one type of lubricant to one machine part from one of the at least two containers, such that when the one of the at least two replaceable containers is empty or near empty, pumping is continued from another of the at least two replaceable containers, and such that when the another of the at least two replaceable containers is empty or near empty, pumping is continued from an additional replaceable container.

23. The method according to item 22, further comprising the step of when the one or the other of the at least two replaceable containers is empty or near empty, one of the at least two replaceable containers is replaced by the additional replaceable container.

24. The method according to any of the preceding items 22-23, wherein the central lubrication comprises at least three replaceable containers, such that the additional replaceable container is one of the at least three replaceable containers.

25. The method according to any of the preceding items 22-24, further comprising the step of pumping one or another type of lubricant to another machine part from the at least two replaceable containers.

26. The method according to any of the preceding items 22-25, further comprising the step of when the one or the other of the at least two replaceable containers is near empty, remaining lubricant is transferred to another of the at least two replaceable containers.

27. The method according to any of the preceding items 22-26, wherein the central lubrication station is the central lubrication station according to any of the preceding items 1-16.

The invention claimed is:

1. A central lubrication station for lubricating at least one machine part, the central lubrication station comprising:
    a housing comprising:
    at least one pump;
    at least one motor configured for driving the at least one pump;
    a container base adapted for attaching a plurality of replaceable containers at the same time, the container base being selectively positionable relative to the at least one pump, wherein each of the replaceable containers holds at least one lubricant, wherein the container base comprises a rotatable disc adapted for attaching the plurality of replaceable containers and rotatable relative to the at least one pump;
    at least one lubricant outlet attached to the container base;
    at least one hose coupled to the lubricant outlet for fluidly connecting the lubricant outlet to the at least one machine part;
    wherein the central lubrication station is configured for pumping, by means of the at least one pump, lubricant from any of the replaceable containers selected by the positionable container base, to the at least one machine part via the at least one hose.

2. The central lubrication station according to claim 1, wherein the container base is configured to allow any of the replaceable containers to be replaced by additional replaceable containers without letting air into the central lubrication station.

3. The central lubrication station according to claim 1, wherein the container base is configured to individually move at least two replaceable containers of the replaceable containers and lubricant within the at least two replaceable containers, such that lubricant in each of the replaceable containers is prevented from sedimenting.

4. A lubrication system for lubricating at least one machine part, comprising the central lubrication station according to claim 1 and the at least two replaceable containers replaceably attached to the container base of the central lubrication station, and a connection between the lubrication station and the at least one machine part.

5. The lubrication system according to claim 4, wherein the connection comprises a lubrication nipple.

6. The lubrication system according to claim 4, wherein the at least one machine part is a bearing, connected to shafts.

7. The lubrication system according to claim 4, wherein the lubrication system is mounted in a nacelle of a wind turbine.

8. A method for operating a central lubricating station, comprising the steps of:
   providing a central lubrication station according to claim 1 and at least two replaceable containers attached thereto, each container holding at least one type of lubricant; and
   pumping one type of lubricant to one machine part from one of the at least two containers, such that when the one of the at least two replaceable containers is empty or near empty, pumping is continued from another of the at least two replaceable containers, and such that when the another of the at least two replaceable containers is empty or near empty, pumping is continued from an additional replaceable container.

9. The method according to claim 8, further comprising the step of when the one or the another of the at least two replaceable containers is empty or near empty, the one or the another of the at least two replaceable containers is replaced by the additional replaceable container.

10. A central lubrication station for lubricating at least two machine parts with different lubricants, the central lubrication station comprising:
    a housing comprising;
    a pump;
    at least a first motor configured for driving the at least one pump;
    a container base adapted for attaching a plurality of replaceable containers at the same time, each of the replaceable containers holding a lubricant;
    at least one lubricant outlet; and
    wherein: 1) the container base moves relative to the at least one pump to select a first of the replaceable containers having a first type of lubricant, and 2) The container base moves relative to the at least one pump to select a second of the replaceable containers having a second type of lubricant.

11. The central lubrication station according to claim 10, wherein the container base is a rotatable disc and the container base moves relative to the pump by rotating.

\* \* \* \* \*